United States Patent [19]
Falla et al.

[11] Patent Number: 5,942,579
[45] Date of Patent: Aug. 24, 1999

[54] POUCHES FOR PACKAGING FLOWABLE MATERIALS

[75] Inventors: Daniel James Falla, Sarnia, Canada; Jose V. Saavedra, Lake Jackson, Tex.

[73] Assignee: The Dow Chemical Company, Midland, Mich.

[21] Appl. No.: 09/133,104

[22] Filed: Aug. 12, 1998

Related U.S. Application Data

[62] Division of application No. 08/540,107, Oct. 6, 1995.

[51] Int. Cl.$^6$ ......................................... C08L 23/00
[52] U.S. Cl. ................... 525/240; 428/35.2; 428/35.7; 526/348; 526/348.6
[58] Field of Search ........................... 525/240; 526/348, 526/348.6; 428/35.2, 35.7

[56] References Cited

U.S. PATENT DOCUMENTS

| | | | |
|---|---|---|---|
| 4,503,102 | 3/1985 | Mollison | 428/35 |
| 4,521,437 | 6/1985 | Storms | 426/130 |
| 5,288,531 | 2/1994 | Falla et al. | 428/35.2 |
| 5,360,648 | 11/1994 | Falla et al. | 428/35.2 |
| 5,364,486 | 11/1994 | Falla et al. | 156/308.4 |

FOREIGN PATENT DOCUMENTS

| | | |
|---|---|---|
| 0 057 238 | 8/1982 | European Pat. Off. |
| 93/03093 | 2/1993 | WIPO |
| 94/06857 | 3/1994 | WIPO |

*Primary Examiner*—James J. Bell
*Attorney, Agent, or Firm*—Tai-Sam Choo

[57] ABSTRACT

An environmentally friendly polymer film pouch made from a polyethylene film structure for the packaging of flowable materials, for example milk, including, for example, a pouch made from a monolayer or multilayer film structure such as a two-layer or a three-layer coextruded film containing at least one layer of a blend of a substantially linear ethylene polymer or a homogeneously branched ethylene polymer and a high pressure low density polyethylene as a seal layer. Also disclosed is a process for making the pouch for packaging flowable materials using a film structure described hereinabove.

10 Claims, 3 Drawing Sheets

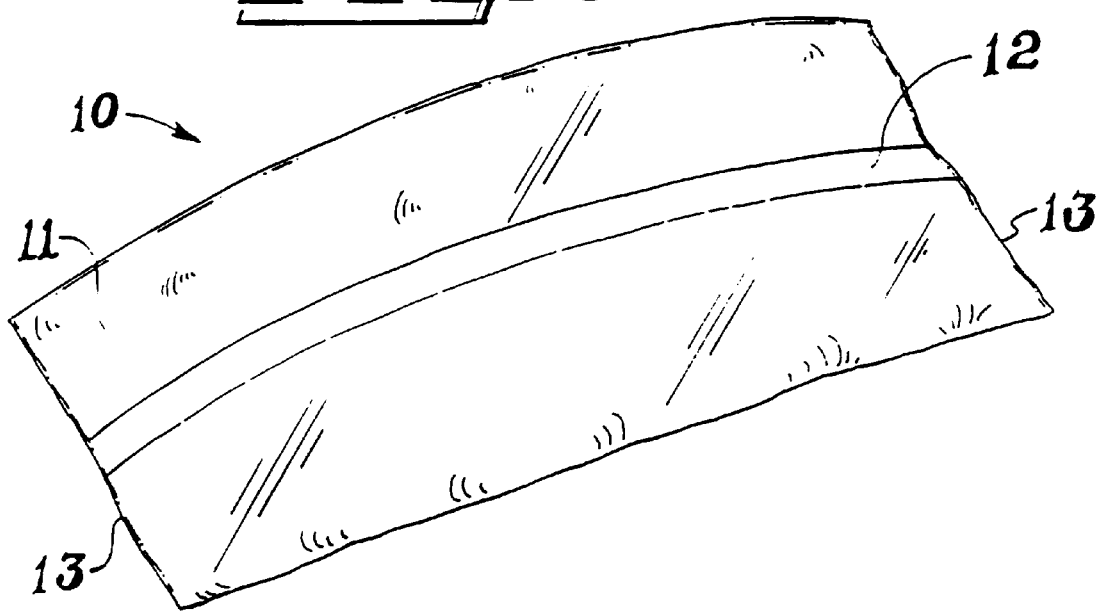
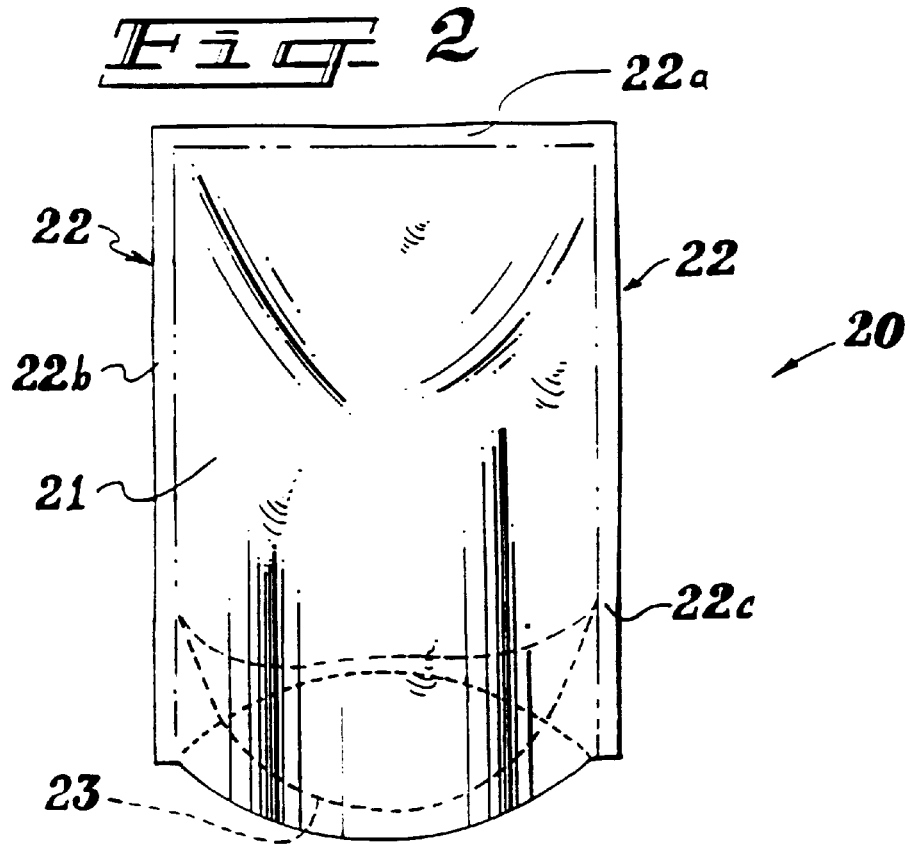

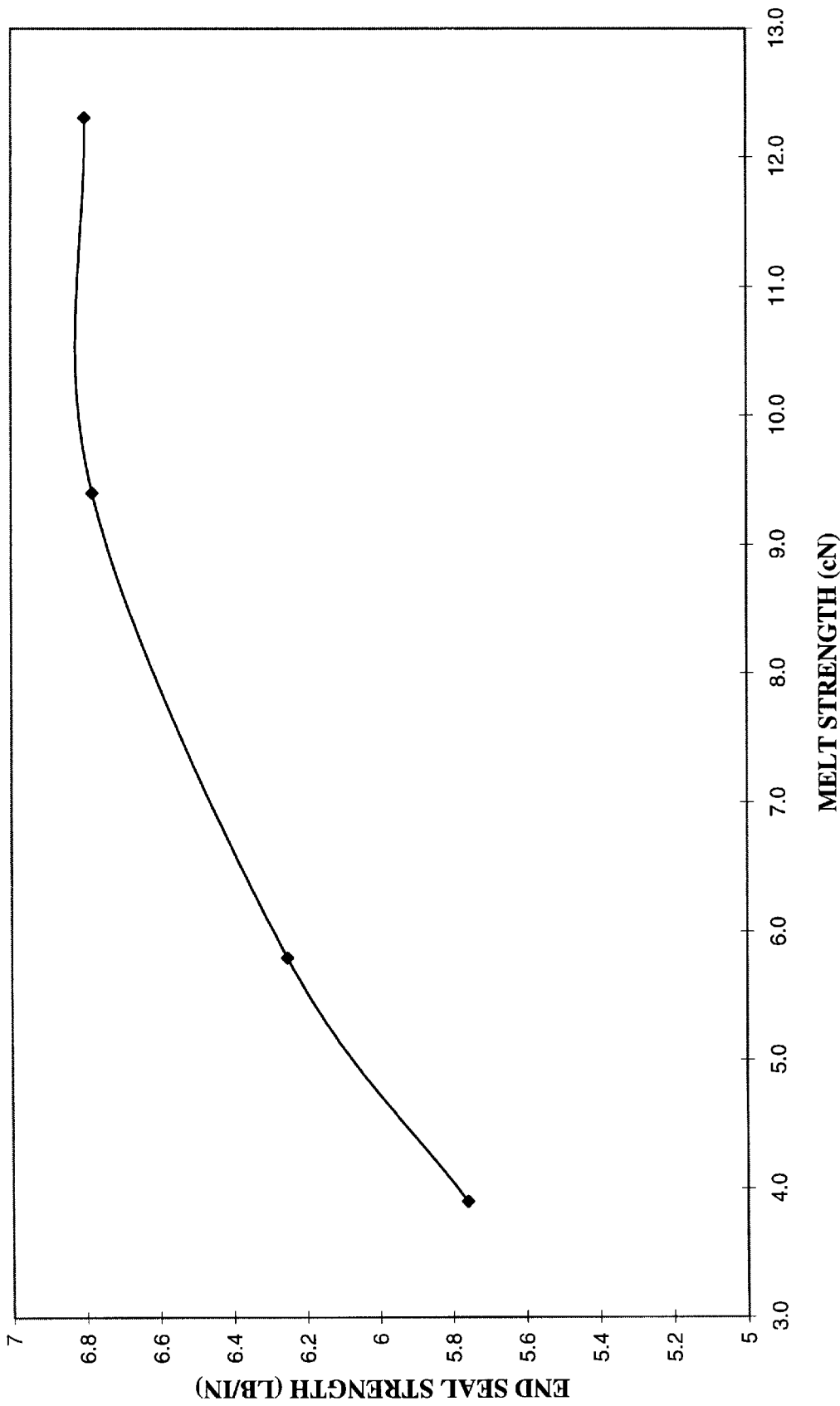

POUCHES FOR PACKAGING FLOWABLE MATERIALS

CROSS-REFERENCE TO RELATED APPLICATION

This application is a divisional of copending application Ser. No. 08/540,107 filed Oct. 6, 1995 pending.

BACKGROUND OF THE INVENTION

This invention relates to a pouch used in consumer packaging made from certain film structures useful for packaging flowable materials, for example liquids such as milk.

U.S. Pat. Nos. 4,503,102, 4,521,437 and 5,288,531 disclose the preparation of a polyethylene film for use in the manufacture of a disposable pouch for packaging of liquids such as milk. U.S. Pat. No. 4,503,102 discloses pouches made from a blend of a linear ethylene copolymer copolymerized from ethylene and an alpha-olefin at the $C_4$ to $C_{10}$ range and a ethylene-vinyl acetate polymer copolymerized from ethylene and vinyl acetate. The linear polyethylene copolymer has a density of from 0.916 to 0.930 g/cm3 and a melt index of from 0.3 to 2.0 g/10 minutes. The ethylene-vinyl acetate polymer has a weight ratio of ethylene to vinyl acetate from 2.2:1 to 24:1 and a melt index of from 0.2 to 10 g/10 minutes. The blend disclosed in U.S. Pat. No. 4,503,102 has a weight ratio of linear low density polyethylene to ethylene-vinyl acetate polymer of from 1.2:1 to 4:1 U.S. Pat. No. 4,503,102 also discloses laminates having as a sealant film the aforementioned blend.

U.S. Pat. No. 4,521,437 describes pouches made from a sealant film which is from 50 to 100 parts of a linear copolymer of ethylene and octene-1 having a density of from 0.916 to 0.930 g/cm3 and a melt index of 0.3 to 2.0 g/10 minutes and from 0 to 50 parts by weight of at least one polymer selected from the group consisting of a linear copolymer of ethylene and a $C_4$–$C_{10}$-alpha-olefin having a density of from 0.916 to 0.930 g/cm3 and a melt index of from 0.3 to 2.0 g/10 minutes, a high-pressure polyethylene having a density of from 0.916 to 0.924 g/cm3 and a melt index of from 1 to 10 g/10 minutes and blends thereof. The sealant film disclosed in the U.S. Pat. No. 4,521,437 is selected on the basis of providing (a) pouches with a M-test value substantially smaller, at the same film thickness, than that obtained for pouches made with film of a blend of 85 parts of a linear ethylene/butene-1 copolymer having a density of about 0.919 g/cm3 and a melt index of about 0.75 g/10 minutes and 15 parts of a high pressure polyethylene having a density of about 0.918 g/cm3 and a melt index of 8.5 g/10 minutes, or (b) an M(2)-test value of less than about 12%, for pouches having a volume of from greater than 1.3 to 5 liters, or (c) an M(1.3)-test value of less than about 5% for pouches having a volume of from 0.1 to 1.3 liters. The M, M(2) and M(1.3)tests are defined pouch drop tests in U.S. Pat. No. 4,521,437. The pouches may also be made from composite films in which the sealant film forms at least the inner layer.

U.S. Pat. No. 5,288,531 discloses pouches made from a film structure having a blend of (a) from 10 to 100 percent by weight of at least one polymeric seal layer of an ultra low density linear ethylene copolymer interpolymerized from ethylene and at least one alpha-olefin in the range of $C_3$–$C_{10}$ with a density of from about 0.89 g/cm3 to less than 0.915 g/cm3 and (b) from 0 to 90 percent by weight of at least one polymer selected from the group consisting of a linear copolymer of ethylene and a $C_3$–$C_{18}$-alpha-olefin having a density of greater than 0.916 g/cm3 and a melt index of from 0.1 to 10 g/10 minutes, a high-pressure low density polyethylene having a density of from 0.916 to 0.930 g/cm3 and a melt index of from 0.1 to 10 g/10 minutes, or ethylene-vinyl acetate copolymer having a weight ratio of ethylene to vinyl acetate from 2.2:1 to 24:1 and a melt index of from 0.2 to 10 g/10 minutes. The heat seal layer in the U.S. Pat. No. 5,288,531 provides improved hot tack strength and lower heat seal initiation temperature to a two-layer or three-layer coextruded multilayer film structure described therein.

The polyethylene pouches known in the prior art have some deficiencies. The problems associated with films known in the prior art relate to the sealing properties and performance properties of the film for preparing pouches, In particular, prior art films made into pouches in general have a high incident of "leakers", i.e., seal defects such as pinholes which develop at or near the seal in which flowable material, for example milk escapes from the pouch. Although the seal and performance properties of the prior art films have been generally satisfactory, there is still a need in the industry for better seal and performance properties in films for manufacture of hermetically sealed pouches containing flowable materials. More particularly, there is a need for improved sealing properties of the film such as hot tack and melt strength in order to improve the processability of the film and to improve pouches made from the films.

For example, the line speed of known packaging equipment used for manufacturing pouches such as form, fill and seal machines, is currently limited by the sealing properties of the film used in the machines. Prior art polyethylene films have low melt strength. Therefore, the speed at which a form, fill and seal machine can produce a pouch is limited and, thus, the number of pouches produced on a form, fill and seal machine is limited. If the melt strength is increased, then the speed of a form, fill and seal machine can be increased and, thus, the number of pouches produced can be increased. Until the present invention, many have attempted to improve sealing properties of the polymeric composition used in pouch film without success.

It is desired to provide a polyethylene film structure for a pouch container having improved melt strength with performance properties as good or better than the known prior art pouch films.

It is also desired to provide a film structure for a pouch container which can be processed through a form fill and seal machine as a monolayer film.

It is further desired to provide a pouch made from the aforementioned film structures such that the pouch has a reduced failure rate.

SUMMARY OF THE INVENTION

One aspect of the present invention provides a pouch containing a flowable material, said pouch being made from a film structure with at least one seal layer of a polymeric composition comprising: (A) from 10 to 100 percent, based on the total weight of said composition, of a mixture of (1) from 5 to 95 percent by weight, based on 100 weight parts of said mixture, of at least one homogeneously branched substantially linear ethylene/α-olefin interpolymer characterized as having: (a) a melt flow ratio, $I_{10}/I_2 \geq 5.63$; (b) a molecular weight distribution, Mw/Mn, defined by the equation: $Mw/Mn \leq (I_{10}/I_2) - 4.63$, and (2) from 5 to 95 percent by weight, based on 100 weight parts of said mixture, of high pressure low density polyethylene having a density from 0.916 to 0.930 g/cm3, a melt index of less than 1 g/10 minutes and melt strength greater than 10 cN as determined using a Gottfert Rheotens unit at 190° C.; and (B) from 0 to 90 percent, based on the total weight of said composition, at least one polymer selected from the group consisting of an ultra low density polyethylene, a linear low density polyethylene, a high pressure low density polyethylene, an ethylene-vinyl acetate copolymer, and a homogeneously branched linear ethylene polymer.

Another aspect of the present invention provides a pouch containing a flowable material, said pouch being made from a film structure with at least one seal layer of a polymeric composition comprising: (A) from 10 to 100 percent, based on the total weight of said composition, of a mixture of (1) from 5 to 95 percent by weight, based on 100 weight parts of said mixture, a homogeneously branched linear ethylene polymer, and (2) from 5 to 95 percent by weight, based on 100 weight parts of said mixture, of high pressure low density polyethylene having a density from 0.916 to 0.930 g/cm$^3$, a melt index of less than 1 g/10 minutes and melt strength greater than 10 cN as determined using a Gottfert Rheotens unit at 190° C.; and (B) from 0 to 90 percent, based on the total weight of said composition, at least one polymer selected from the group consisting of an ultra low density polyethylene, a linear low density polyethylene, a high pressure low density polyethylene, an ethylene-vinyl acetate copolymer, and homogeneously branched substantially linear ethylene/α-olefin interpolymer.

One embodiment of the present invention is a pouch made from a two-layer coextruded film containing an outer layer of substantially linear ethylene polymer or homogeneously branched linear ethylene polymer and an inner seal layer of the aforementioned polymeric composition.

Another embodiment of the present invention is a pouch made from a three-layer coextruded film containing an outer layer and a core layer of substantially linear ethylene polymer or homogeneously branched linear ethylene polymer and an inner seal layer of the aforementioned polymeric composition.

Another aspect of the present invention is a process for preparing the aforementioned pouch.

Yet another embodiment of the present invention is a pouch made from a three-layer coextruded film containing an outer layer and a core layer of ultra low density polyethylene, linear low density polyethylene, high pressure low density polyethylene, and ethylenevinyl acetate copolymer, or a mixture thereof and an inner seal layer of the aforementioned polymeric composition.

It has been discovered that the film structures for the pouches of the present invention have an improved melt strength and heat seal strength, particularly the end-seal strength. Use of the films for making pouches of the present invention in form, fill and seal machines leads to machine speeds higher than currently obtainable with the use of commercially available film.

BRIEF DESCRIPTION OF THE DRAWINGS

FIG. 1 shows a perspective view of a pouch package of the present invention.

FIG. 2 shows a perspective view of another pouch package of the present invention.

FIG. 6 is a graphical illustration of end seal strength versus melt strength for blends of AFFINITY PL1880 with high pressure low density polyethylene.

DETAILED DESCRIPTION OF THE INVENTION

Figure 3:
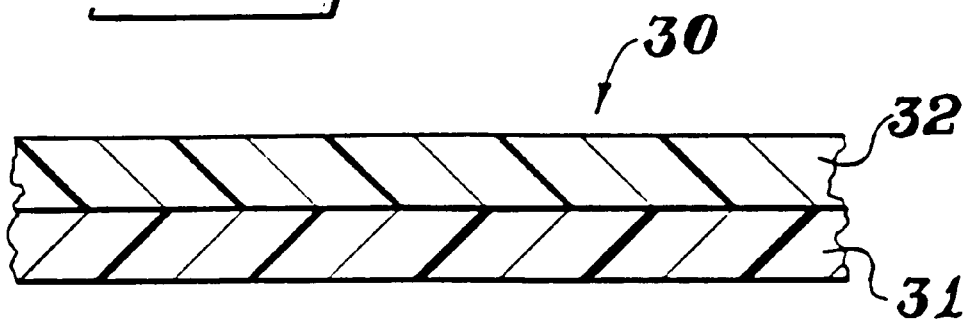
FIG. 3 shows a partial, enlarged cross-sectional view of the film structure of a pouch of the present invention.

The pouch of the present invention, for example as shown in FIG. 1 and 2, for packaging flowable materials is manufactured from a three-layer coextruded film structure having a polymeric seal layer comprised of a blend of a substantially linear ethylene polymer or homogeneously branched linear ethylene polymer and a high pressure low density polyethylene having a high melt strength. The blend can also contain an ethylene vinylacetate copolymer, ultra low density polyethylene ("ULDPE"), linear low density polyethylene ("LLDPE") and high pressure low density polyethylene.

"Melt strength" which is also referred to in the relevant art as "melt tension" is defined and quantified herein to mean the stress or force (as applied by a wind-up drum equipped with a strain cell) required to draw a molten extrudate at some specified rate above its melting point as it passes through the die of a standard plastometer such as the one described in ASTM D1238-E. Melt strength values, which are reported herein in centi-Newtons (cN), are determined using a Gottfert Rheotens at 190° C. In general, for ethylene α-olefin interpolymers and high pressure ethylene polymers, melt strength tends to increase with increased molecular weight, or with broadening of the molecular weight distribution and/or with increased melt flow ratios. The melt strength of the high pressure low density polyethylene of the present invention is greater than 10 cN as determined using a Gottfert Rheotens unit at 190° C., preferably from about 13 to 40 cN, and most preferably 15 to 25 cN. Further, the melt strength of the polymeric composition of the present invention is greater than 5 cN as determined using Gottfert Rheotens unit at 190° C., preferably from about 15 to 70 cN, and most preferably 15 to 50.

One component of the polymer composition of the present invention is a homogeneously branched ethylene polymer having long chain branching, sometimes referred to as substantially linear ethylene polymer is described in the U.S. Ser. No. 301,948, which description is incorporated herein by reference in its entirety.

Preferred ethylene polymers for use in the present invention are those claimed in the U.S. Ser. No. 301,948 and are interpolymers of ethylene with at least one $C_3$–$C_{20}$ α-olefins.

As used herein, the term "interpolymer" includes copolymer, terpolymer and the like. These ehthylene/α-olefin interpolymers preferably have a density, as measured by ASTM D-792, from about 0.85 g/cm3 to about 0.94 g/cm3 and a melt index ($I_2$), as measured according to ASTM D-1238 (condition 190/2.16) from about 0.01 g/10 min. to about 10 g/10 min., and a melt flow ratio ($I_{10}/I_2$) from about 5.6 to about 30.

$I_{10}$ is measured in accordance with ASTM D-1238 (condition 190/10). Novel ethylene interpolymers, depending on their density, can also have a critical shear stress at the onset of gross melt fracture of greater than about 4×10$^6$ dynes/cm2. However, all of these novel ethylene interpolymers have a critical shear rate, at onset of surface melt fracture, at least 50% greater than the critical shear rate at the onset of surface melt fracture of a linear ethylene polymer having about the same $I_2$, Mw/Mn, and density. By the term "about the same" as used herein, is meant that each value is within 10% of the value of the other polymer. These novel ethylene interpolymers also preferably have a molecular weight distribution (Mw/Mn) less than about 3.5, especially from 1.5 to 2.5.

The terms "homogeneous branching distribution" and "homogeneously branched" refer to interpolymers and are defined herein to mean that (1) the α-olefin monomer is randomly distributed within a given molecule, (2) substantially all of the interpolymer molecules have the same ethylene-to-α-olefin monomer ratio, (3) the interpolymer is characterized by a narrow short chain branching distribution wherein the composition distribution range index is greater than about 30 percent, preferably greater than about 50 percent, more preferably greater than about 80 percent, most preferably greater than about 9 percent, (4) the interpolymer essentially lacks a measurable high density (crystalline) polymer fraction as measured by known fractionation techniques such as for example, a method that involves polymer fractional elutions as a function of temperature, and (5) the interpolymer is characterized as having substantially reduced levels of n-hexane extractables or substantial amorphism as determined by the FDA test method published as CFR 177.1520(c). By "substantial amorphism", it is meant that greater than 75 weight percent of the whole interpolymer is soluble under prescribed test conditions.

The term "homogeneously branched linear ethylene polymer" means that the olefin polymer has a homogeneous short branching distribution but does not have long chain branching. That is, the linear ethylene polymer has an absence of long chain branching. Such polymers include linear low density polyethylene polymers and linear high density polyethylene polymers and can be made using polymerization processes (e.g., as described by Elston in U.S. Pat. No. 3,645,992, the disclosure of which is incorporated herein by reference) which provide uniform branching (i.e., homogeneously branched) distribution. Uniform branching distributions are those in which the comonomer is randomly distributed within a given interpolymer molecule and wherein substantially all of the interpolymer molecules have the same ethylene/comonomer ratio within that interpolymer. In his polymerization process, Elston uses soluble vanadium catalyst system to make such polymers, however others such as Mitsui Chemical corporation and Exxon Chemical Company have used so-called single site catalyst systems to make polymers having a similar homogeneous structure.

The term "homogeneously branched linear ethylene polymer" does not refer to high pressure branched polyethylene which is known to those skilled in the art to have numerous long chain branches. Typically, the homogeneously branched linear ethylene polymer is an ethylene/α-olefin interpolymer, wherein the -olefin is at least one $C_3$–$C_{20}$ α-olefin (e.g., 1-propylene, 1-butene, 1-pentene, 4-methyl-1-pentene, 1-hexene, 1-octene and the like), preferably wherein at least one of the α-olefins is 1-octene. Most preferably, the ethylene/α-olefin interpolymer is a copolymer of ethylene and a $C_3$–$C_{20}$ α-olefin, especially an ethylene/$C_4$–$C_6$ α-olefin copolymer.

The term "narrow short chain distribution" as applied herein refers to interpolymers and pertains to the distribution of α-olefin monomer branches of the interpolymer as characterized by its SCBDI (Short Chain Branch Distribution Index) or CDBL (Composition Distribution Branch Index). The term is defined herein as greater than about 30 weight percent of the interpolymer molecules have an α-olefin monomer content within 50 percent of the median total molar α-olefin monomer content. CDBI of an interpolymer can be readily calculated from data obtained from techniques known in the art, such as for example, temperature rising elution fractionation (abbreviated herein as "TREF") as described, for example, by Wild, et al., Journal of Polymer Science, Poly. Phys Ed., Vol. 20, p. 441 (1982), or in U.S. Pat. No. 4,798,081, both disclosures of which are incorporated herein by reference. However, the preferred TREF techniques does not include purge quantities in CDBI calculations. More preferably, the monomer distribution of the interpolymer and CDBI are determined using 13CNMR analysis in accordance with techniques described in U.S. Pat. No. 5,292,845 and by J. C. Randall in Rev. Macromol. Chem. Phys., C29, pp. 201–317 both disclosures of which are incorporated herein by reference.

Homogeneously branched VLDPE and LLDPE are also well known among practitioners of the linear polyethylene art. See, for example Elston disclosure in U.S. Pat. No. 3,645,992. They can be prepared in solution, slurry or gas phase processes using hafnium, zirconium and vanadium catalyst systems. Ewen, et al. in U.S. Pat. No. 4,937,299 described a method of preparation using metallocene catalysts. The disclosures of Elston and Ewen are incorporated herein by reference. This second class of linear polyethylenes are homogeneously branched polymers, but like the Ziegler-type heterogeneous linear polyethylene, they do not have any long-chain branching. Commercial examples of these polymers are sold by Mitsui Chemical under the designation "TAFMER" and by Exxon Chemical under the designation "EXACT".

Heterogeneously branched VLDPE and LLDPE are well known among practitioners of the linear polyethylene art. They are prepared using Ziegler-Natta solution, slurry or gas phase polymerization processes and coordination metal catalysts as described, for example, by Anderson et al. in U.S. Pat. No. 4,076,698, the disclosure of which is incorporated herein by reference. These Ziegler-type linear polyethylenes are not homogeneously branched and they do not have any long-chain branching. Also, these polymers do not show any substantial amorphism at lower densities since they inherently posses a substantial high density (crystalline) polymer fraction. At a density less than 0.90 g/cc, these materials are very difficult to prepare using conventional Ziegler-Natta catalysis and are also very difficult to pelletize. The pellets are tacky and tend to clump together.

The terms "heterogeneous" and heterogeneously branched" are used herein in the conventional sense in reference to a linear ethylene interpolymer having a comparatively low short chain branching distribution index. The short chain branching distribution index (SCBDI) is defined as the weight percent of the polymer molecules having a comonomer content within 50 percent of the median total molar comonomer content. The short chain branching distribution index of polyolefins that are crystallizable from solutions can be determined by well-known temperature rising elution fractionation techniques, such as those described by Wild, et al., Journal of Polymer Science, Poly. Phys. Ed., Vol. 20, p. 441 (1982), L. D. Cady, "The Role of Comonomer Type and Distribution in LLDPE Product Performance," SPE Regional Technical Conference, Quaker Square Hilton, Akron, Ohio, October 1–2, pp. 107–119 (1985), or U.S. Pat. No. 4,798,081.

The terms "ultra low density polyethylene" (ULDPE), "very low density polyethylene" (VLDPE) and "linear very low density polyethylene" (LVLDPE) have been used interchangeable in the polyethylene art to designate the polymer subset of linear low density polyethylenes having a density about 0.915 g/cc. The term "linear low density polyethylene" (LLDPE) is then applied to those linear polyethylenes having a density above 0.915 g/cc. These terms do not, in themselves, indicate whether the polymer is homogeneously branched or heterogeneously branched.

Commercial examples of heterogeneously branched linear interpolymers suitable for use in the present invention include ATTANE ULDPE polymers supplied by The Dow Chemical Company and FLEOXMER VLDPE polymers supplied by Union Carbide Corporation.

Yet another component of the polymer composition of the present invention is a polyethylene referred to hereinafter as "linear low density polyethylene" ("LLDPE"). An example of a commercially available LLDPE is DOWLEX™ 2045 (Trademark of and commercially available from The Dow Chemical Company). The LLDPE is generally a linear copolymer of ethylene and a minor amount of an α-olefin having from 3 to about 18 carbon atoms, preferably from 4 to about 10 carbon atoms and most preferably 8 carbon atoms. The LLDPE for the polymeric composition of the present invention has a density of greater than 0.916 g/cm3, more preferably from about 0.916 to about 0.940 g/cm3, most preferably from about 0.918 to about 0.926 g/cm3; generally has a melt index of less than 10 g/10 minutes, preferably from about 0.1 to about 10 g/10 minutes, most preferably from about 0.5 to about 2 g/10 minutes and generally has an $I_{10}/I_2$ ratio of from about 0.1 to about 20, preferably from about 5 to about 20, and most preferably 7 to 20.

The LLDPE can be prepared by the continuous, batch or semi-batch solution, slurry or gas phase polymerization of ethylene and one or more optional α-olefin comonomers in the presence of a Ziegler Natta catalyst, such as by the process disclosed in U.S. Pat. No. 4,076,698 to Anderson et al., incorporated herein by reference.

Suitable α-olefin for the LLDPE of the present invention are represented by the following formula:

where R is a hydrocarbyl radical having from one to twenty carbon atoms. The interpolymerization process can be a solution, slurry or gas phase technique or combinations thereof. Suitable α-olefin for use as comonomers include 1-propylene, 1-butene, 1-isobutylene, 1-pentene, 1-hexene, 4-methyl-1-pentene, 1-heptene and 1-octene, as well as other monomer types such as styrene, halo- or alkyl-substituted styrenes, tetrafluoro-ethylene, vinyl benzocyclobutane, 1,4-hexadiene, 1,7-octadiene, and cycloalkenes, e.g., cyclopentene, cyclohexene and cyclooctene. Preferably, the α-olefin will be 1-butene, 1-pentene, 4-methyl-1-pentene, 1-hexene, 1-heptene, 1-octene, or mixtures thereof. More preferably, the α-olefin will be 1-hexene, 1-heptene, 1-octene, or mixtures thereof, as coatings, profiles and films fabricated with the resultant extrusion composition will have especially improved abuse properties where such higher α-olefins are utilized as comonomers. However, most preferably, the α-olefin will be 1-octene and the polymerization process will be a continuous solution process.

The molecular weight distribution of the ethylene α-olefin interpolymer compositions and the high pressure ethylene polymer compositions are determined by gel permeation chromatography (GPC) on a Waters 150 high temperature chromatographic unit equipped with differential refractometer and three columns of mixed porosity. The columns are supplied by Polymer Laboratories and are commonly packed with pore sizes of $10^3$, $10^4$, $10^5$ and $10^6$Å. The solvent is 1,2,4-trichlorobenzene, from which 0.3 percent by weight solutions of the samples are prepared for injection. The flow rate is 1.0 milliliters/minute, unit operating temperature is 140° C. and the injection size is 100 microliters.

The molecular weight determination with respect to the polymer backbone is deduced by using narrow molecular weight distribution polystyrene standard (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science*, Polymer Letters, Vol. 6, p. 621, 1968) to derive the following equation:

$$^M\text{polyethylene} = a* (^M\text{polystyrene})^b.$$

In this equation, a =0.4316 and b =1.0. Weight average molecular weight, $M_w$, is calculated in the usual manner according to the following formula: $M_w = \Sigma w_i \times M_i$, where $w_i$ and $M_i$ are the weight fraction and molecular weight, respectively, of the $i^{th}$ fraction eluting from the GPC column.

For LLDPE, the Mw/Mn is preferably about 2 to 7, especially about 4.

The high pressure low density polyethylene ("LDPE") useful for the polymer compositions and blends of this invention is widely known and readily available. The LDPE has a density of about 0.916 g/cm³ to about 0.930 g/cm³, and a melt index from about 0.1 to about 1 g/10 minutes. The LDPE used to form a blend with homogeneously branched substantially linear ethylene/α-olefin interpolymer or homogeneously branched linear ethylene polymer for use in the seal layer of this invention has a melt strength of greater than 10 cN as determined using a Gottfert Rheotens unit at 190° C. A further description of the high pressure low density polyethylene is found in *Modern Plastics Encyclopedia*, Mid-October 1992 Issue, Volume 68, Number 11, pages 61 to 63, which description is incorporated by its entirety by reference.

The ethylene-vinyl acetate copolymer ("EVA") useful for polymer compositions and blends of this invention has a weight ratio of ethylene to vinyl acetate from 2.2:1 to 24:1 and a melt index of from about 0.2 g to about 10 g/10 minutes. A further description of EVA is found in *Modern Plastics Encyclopedia*, Mid- October 1992 Issue, Volume 68, Number 11, page 66, which description is incorporated by reference in its entirety.

It is believed that the use of LDPE having high melt strength in a film structure for pouches of the present invention (1) provided a pouch that can be fabricated at a fast rate through a form, fill and seal machine, and (2) provides a pouch package having few leakers, particularly when the pouch of the present invention is compared to pouches made with linear low density polyethylene, low density polyethylene or a combination thereof.

Figure 4:
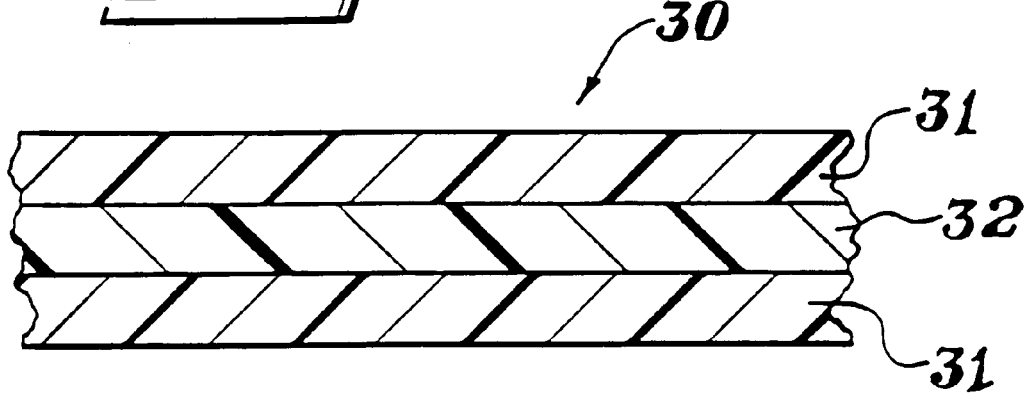
FIG. 4 shows another partial, enlarged cross-sectional view of the film structure of a pouch of the present invention.
Figure 5:
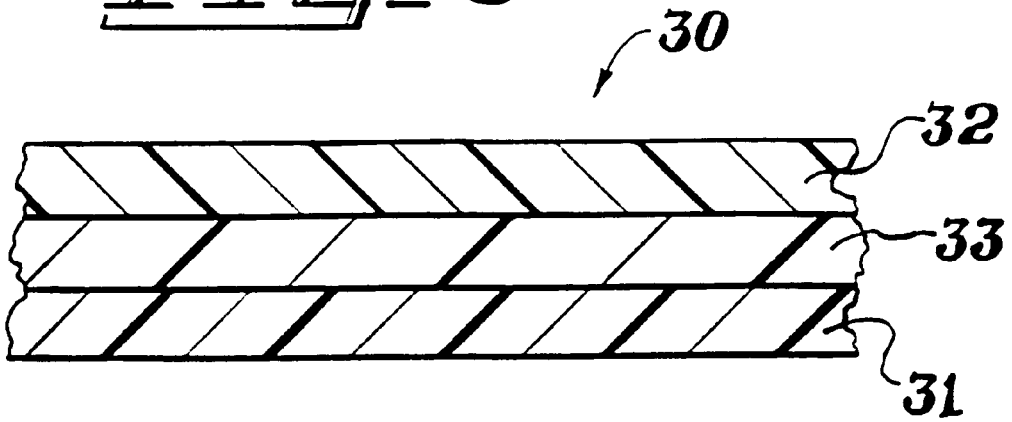
FIG. 5 shows yet another partial, enlarged cross-sectional view of the film structure of a pouch of the present invention.

With reference to FIGS. 3 to 5, the film structure of the pouch of the present invention also includes a multilayer or composite film structure 30, preferably containing the above-described polymer seal layer being the inner layer of the pouch.

As will be understood by those skilled in the art, the multilayer film structure for the pouch of the present invention may contain various combination of film layers as long as the seal layer forms part of the ultimate film structure. The multilayer film structure for the pouch of the present invention may be a coextruded film, a coated film or a laminated film. The film structure also included the seal layer in combination with a barrier film such as polyester, nylon, EVOH, polyvinylidene dichloride (PVDC) such as SARANTM (Trademark of The Dow Chemical Company), metallized films and thin metal foils. The end use for the pouch tends to dictate, in a large degree, the selection of the other material or materials used in combination with the seal layer film. The pouches described herein will refer to seal layers used at least on the inside of the pouch.

One embodiment of the film structure 30 for the pouch of the present invention, shown in FIG. 3, comprises seal layer 31 of a blend of a homogeneously branched substantially linear ethylene α-olefin interpolymer or a homogeneously branched linear ethylene polymer and high melt strength LDPE of this invention and at least one polymeric outer layer 32. The polymeric outer layer 32 is preferably a polyethylene film layer, more preferably a LLDPE. An example of a commercially available LLDPE is DOWLEX™ 2045 (Trademark of the commercially available from The Dow Chemical Company). The thickness of the outer layer 32 may be any thickness so long as the seal layer 31 has a minimum thickness of about 0.1 mil (2.5 microns).

Another embodiment of the film structure 30 for the pouch of the present invention, shown in FIG. 4, comprises the polymeric layer 32 sandwiched between two polymeric seal layers 31.

Still another embodiment of the film structure 30 for the pouch of the present invention, shown in FIG. 5, comprises at least one polymeric core layer 33 between at least one polymeric outer layer 32 and at least one polymeric seal layer 31. The polymeric layer 33 may be the same polymer layer as the outer layer 32 or preferably a different polymer, and more preferably an LDPE, for example DOWLEX™ 2049 (Trademark of and commercially available from The Dow Chemical Company) that has a higher density than the outer layer 32. The thickness of the core layer 33 may be any thickness so long as the seal layer 31 has a minimum thickness of about 0.1 mil (2.5 microns).

The ultimate film thickness of the final film product used for making the pouch of the present invention is from about 0.5 mil (12.7 microns) to about 10 mils (254 microns), preferably from about 1 mil (25.4 microns) to about 5 mils (127 microns); more preferably from about 2 mils (50.8 microns) to 4 mils (100 microns).

Additives, known to those skilled in the art, such as anti-block agents, slip additives, UV stabilizers, pigments and processing aids may he added to the polymers from which the pouches of the present invention are made.

As can be seen from the different embodiments of the present invention shown in FIG. 3–5, the film structure for the pouches of the present invention has design flexibility. Different LDPE polymers can be used in the outer and core layers to optimize specific film properties such as film stiffness. Thus, the film can be optimized for specific applications such as for a vertical form, film and seal machine.

The polyethylene film structure used to make a pouch of the present invention is made by either the blown tube extrusion method or the cast extrusion method, methods well known in the art. The blown tube extrusion method is described, for example, in Modern Plastics Mid-October 1989 Encyclopedia Issue, Volume 66, Number 11, pages 264 to 266. The cast extrusion method is described, for example, in Modern Plastics Mid-October 1989 Encyclopedia Issue, Volume 66, Number 11, pages 256 to 257.

Embodiments of the pouches of the present invention, shown in FIG. 1 and 2 are hermetically sealed containers filled with "flowable materials". By "flowable materials" it is meant, materials which are flowable under gravity or which may be pumped. The term "flowable materials" does not include gaseous materials. The flowable materials include liquids for example milk, water, fruit juice, oil; bodily fluids, chemical reagents and various liquids used for medical treatments and diagnoses emulsions for example ice cream mix, soft margarine; pastes for example meat pates, peanut butter; preservers for example jams, pie fillings marmalade; jellies; doughs; ground meat for example sausage meat; powders for example gelatin powders, detergents; granular solids for example nuts, sugar; and like materials. The pouch of the present invention is particularly useful for liquid foods for example milk. The flowable material may also include oleaginous liquids for example cooking oil or motor oil.

Once the film structure for the pouch of the present invention is made, the film structure is cut to the desired width for use in conventional pouch-forming machines. The embodiments of the pouch of the present invention shown in FIGS. 1 and 2 are made in so-called form, fill and seal machines well known in the art. With regard to FIG. 1, there is shown a pouch 10 being a tubular member 11 having a longitudinal lap seal 12 and transverse seals 13 such that, a "pillow-shaped" pouch is formed when the pouch is filled with flowable material.

With regard to FIG. 2, there is shown a pouch 20 being a tubular member 21 having a peripheral fin seal 22 along three sides of the tubular member 21, that is, the top seal 22a and the longitudinal side seals 22b and 22c, and having a bottom substantially concave or "bowl-shaped" member 23 sealed to the bottom portion of the tubular member 21 such that when viewed in cross-section, longitudinally, substantially a semi-circular or "bowed-shaped" bottom portion is formed when the pouch is filled with flowable material. The pouch shown in FIG. 2 is an example of so-called "Enviro-Pak" pouch known in the art.

The pouch manufactured according to the present invention is preferably the pouch shown in FIG. 1 made on so-called vertical form, fill and seal (VFFS) machines well known in the art. Examples of commercially available VFFS machines include those manufactured by Hayssen, Thimonnier, Tetra Pak, or Prepac. A VFFS machine is described in the following reference: F. C. Lewis, "Form-Fill-Seal," Packaging Encyclopedia, page 180, 1980.

In a VFFS packaging process, a sheet of the plastic film structure described herein is fed into a VFFS machine where the sheet is formed into a continuous tube in a tube-forming section. The tubular member is formed by sealing the longitudinal edges of the film together—either by lapping the plastic film and sealing the film using an inside/outside seal or by fin sealing the plastic film using an inside/inside seal. Next, a sealing bar seals the tube transversely at one end being the bottom of the "pouch", and then the fill material, for example milk, is added to the "pouch." The sealing bar then seals the top end of the pouch and either burns through the plastic film or cuts the film, thus, separating the formed completed pouch from the tube. The process of making a pouch with a VFFS machine is generally described in U.S. Pat. Nos. 4,503,102 and 4,521,437 incorporated herein by reference.

The capacity of the pouches of the present invention may vary. Generally, the pouches may contain from about 5 milliliters to about 10 liters, preferably from about 1 liter to about 8 liters, and more preferably from about 1 milliliter to about 5 liters of flowable material.

The film structure for the pouch of the present invention has precisely controlled strength. The use of the film structure described in the present invention for making a pouch results in a stronger pouch, and, therefore, more preferably, the pouch contains fewer use-related leakers. The use of a substantially linear ethylene polymer or homogeneously branched linear ethylene polymer and LDPE blend in the seal layer of the present invention in a two or three-layer coextruded film product will provide a film structure that can be used for making pouches at a faster rate in the VFFS and such pouches produced will contain fewer leakers.

With the trend in today's consumer packaging industry moving toward providing the consumer with more environmentally friendly packages, the polyethylene pouch of the present invention is a good alternative. The use of the polyethylene pouch for packaging consumer liquids such as milk has its advantages over containers used in the past: the glass bottle, paper carton, and high density polyethylene jug. The previously used containers consumed large amounts of natural resources in their manufacture, required a significant amount of space in landfill, used a large amount of storage space and used more energy in temperature control of the product (due to the heat transfer properties of the container).

The polyethylene pouch of the present invention made of thin polyethylene film, used for liquid packaging, offers many advantages over the containers used in the past. The polyethylene pouch (1) consumes less natural resources, (2) requires less space in a landfill, (3) can be recycled, (4) can be processed easily, (5) requires less storage space, (6) uses less energy for storage (heat transfer properties of package), (7) can be safely incinerated and (8) can be reused, for example, the empty pouch can be used for other applications such as freezer bags, sandwich bags, and general purpose storage bags.

The polymeric resins described in Table I herein below were used to prepare samples of blown films shown in the Examples and Comparative Examples.

TABLE I

Resin Properties

| Resin Name | Type | Melt Index, dg/min. | Density, g/cc | Melt Strength, cN |
|---|---|---|---|---|
| AFFINITY PL1880 | SLEP | 1.0 | 0.903 | 4 |
| DOWLEX 2045 | LLDPE | 1.0 | 0.920 | 6 |
| EXACT 3033 | POP-terpolymer | 1.3 | 0.902 | 7 |
| LDPE 135I | LDPE (tube) | 0.22 | 0.923 | 19 |
| XU60021.62 | LDPE (autoclave) | 0.5 | 0.919 | 25 |
| LDPE 609C | LDPE (tube) | 0.88 | 0.924 | 10 |
| LDPE 526I | LDPE (tube) | 1.0 | 0.903 | 12 |

Erucamide, a slip agent; $SiO_2$, an antiblock agent; and a processing aid were added to each of the resins described in Table I such that the final concentrations of the additives were as follows: 1200 ppm erucamide; 2500 ppm $SiO_2$.

The composition of various LDPE and LLDPE blends and their melt strength is shown in Table II below.

TABLE II

Melt Strength of Resin Blends

| Blend Designation | Description (*) | Melt Strength (cN) |
|---|---|---|
| 1 | DOWLEX 2045 | 6.4 |
| 2 | AFFINITY PL1880 | 3.9 |
| 3 | EXACT 303 | 7.3 |
| 4 | LDPE 526I | 12.1 |
| 5 | LDPE 135I | 19.5 |
| 6 | LDPE 609C | 12.1 |
| 7 | LDPE XU60021.62 | 24.3 |
| 8 | DOWLEX 2045/10% 135I | 10.4 |
| 9 | DOWLEX 2045/20% 135I | 16.0 |
| 10 | DOWLEX 2045/30% 135I | 19.7 |
| 11 | DOWLEX 2045/10% 609C | 9.5 |
| 12 | DOWLEX 2045/20% 609C | 11.7 |
| 13 | DOWLEX 2045/30% 609C | 13.4 |
| 14 | DOWLEX 2045/10% XU60021.62 | 11.5 |
| 15 | DOWLEX 2045/20% XU60021.62 | 24.2 |
| 16 | DOWLEX 2045/30% XU60021.62 | 30.4 |
| 17 | AFFINITY PL1880/10% 135I | 6.9 |
| 18 | AFFINITY PL1880/20% 135I | 9.4 |
| 19 | AFFINITY PL1880/30% 135I | 9.7 |
| 20 | AFFINITY PL1880/10% 526I | 4.9 |
| 21 | AFFINITY PL1880/20% 526I | 5.8 |
| 22 | AFFINITY PL1880/30% 526I | 6.6 |
| 23 | AFFINITY PL1880/10% XU60021.62 | 8.4 |
| 24 | AFFINITY PL1880/20% XU60021.62 | 12.3 |
| 25 | AFFINITY PL1880/30% XU60021.62 | 14.7 |
| 26 | EXACT 3033/10% 135I | 12.6 |
| 27 | EXACT 3033/20% 135I | 17.6 |
| 28 | EXACT 3033/30% 135I | 20.0 |
| 29 | EXACT 3033/10% 526I | 9.7 |
| 30 | EXACT 3033/20% 526I | 15.2 |
| 31 | EXACT 3033/30% 526I | 15.0 |
| 32 | EXACT 3033/10% XU60021.62 | 15.0 |
| 33 | EXACT 3033/20% XU60021.62 | 21.7 |
| 34 | EXACT 3033/30% XU60021.62 | 39.8 |

(*) % refers to percent by weight of LDPE in the blend

A 5 kg sample of each blend shown in Table II was processed through a Leistritz twin screw extruder. The melt strength of the blends were determined using a Gottfert Rheotens unit.

TABLE III

Resin Blends for Multilayer (A/B/A) Films for Physical Property Testing

| Example No. | Resin Blend in Layer A | Resin Blend in Layer B | Overall Gauge (Mils) |
|---|---|---|---|
| 1A | AFFINITY PL1880 + 20%(*) LDPE 135I | DOWLEX 2045 + 20% LDPE 135I | 2.46 |
| 1B | AFFINITY PL1880 + 20% LDPE 135I | DOWLEX 2045 + 80% LDPE 135I | 2.49 |
| 2 | AFFINITY PL1880 + 20% LDPE 503I | DOWLEX 2045 + 20% LDPE 503I | 2.50 |
| 3 | AFFINITY PL1880 + 20% LDPE 526I | DOWLEX 2045 + 20% LDPE 526I | 2.10 |
| 4 | AFFINITY PL1880 + 20% XU60021.62I | DOWLEX 2045 + 20% XU60021.62 | 2.50 |
| Comp. A | 100% AFFINITY PL1880 | 100% DOWLEX 2045 | 2.54 |
| 5 | EXACT 3033 + 20% LDPE 135I | DOWLEX 2045 + 20% LDPE 135I | 2.55 |
| 6 | EXACT 3033 + 20% LDPE 503I | DOWLEX 2045 + 20% LDPE 503I | 2.30 |
| 7 | EXACT 3033 + 20% LDPE 526I | DOWLEX 2045 + 20% LDPE 526X | 2.57 |
| 8 | EXACT 3033 + 20% LDPE XU60021.62 | DOWLEX 2045 + 20% XU60021.62 | 2.45 |
| Comp. B | 100% EXACT 3033 | 100% DOWLEX 2045 | 2.58 |

(*)% refers to percent by weight of LDPE in the blend

EXAMPLES 1–8 AND COMPARATIVE EXAMPLE A AND B

Multilayered blown films were made using the resin blends described in Table III and an Egan 3-layer co-extrusion line. The line was operated at standard extruder conditions with a blow up ratio of 2.0 and melt temperature of 430° F. The 3 layers of the coextruded film consisted of two identical skin layers (A) and a core layer (B) in a A/B/A configuration, having the layer ratio of A:B:A equal to 1:3:1. All layers were formulated to contain the same level of slip, antiblock and processing aid. In films containing LDPE, each of the three layers contained 20% by weight of LDPE as indicated in Table III except Example IB. The film made from the resin blend of Example 1B in Table II comprised of 20% by weight of DOWLEX 2045 and 80% by weight of LDPE 135I in the core layer (B).

Film structures produced were subjected to physical testing to determine the various properties thereof including:

(1) Puncture, using method ASTM D3763;

(2) Dart Impact, using ASTM D1709, Method A;

(3) Elmendorf Tear, using ASTM D1922;

(4) Tensiles, using ASTM D882;

(5) 1% and 2% Secant Modulus, using ASTM D882;

(6) Hot Tack Strength, using method described hereinbelow; and (7) Heat Seal Strength, using method described hereinbelow;

The hot tack strength of sample films was measured using the "DTC Hot Tack Test Method," which measures the force required to separate a heat seal before the seal has had a chance to fully cool (crystallize). This simulates the filling of material into a pouch before the seal has had a chance to cool.

The "DTC Hot Tack Test Method" is a test method using a DTC Hot Tack Tester Model #52D according to the following conditions:

Specimen Width: 25.4 mm

Sealing Time: 0.5 seconds

Sealing Pressure: 0.27 N/mm/mm

Delay Time: 0.5 seconds

Peel Speed: 150 mm/seconds

Number of Samples/Temperature 5

Temperature Increments: 5° C.

Temperature Range: 75° C.–150° C.

The heat seal strength of sample films was measured using the "DTC Heat Seal Strength Test Method," which is designed to measure the force required to separate a seal after the material has cooled to 23° C. temperature. The film samples were exposed to a relative humidity of 50 percent and a temperature of 23° C. for a minimum of 24 hours prior to testing.

The "DTC Heat Seal Strength Test Method" uses a DTC Hot Tack Tester Model #52D, wherein the heat seal portion of the tester is used, according to the following conditions:

Specimen Width: 25.4 mm

Sealing Time: 0.5 seconds

Sealing Pressure: 0.27 N/mm/mm

Number of Samples/Temperature 5

Temperature Increments: 5° C.

Temperature Range: 80° C.–150° C.

The seal strength of the film samples was determined using an Instron Tensile Tester Model #1122 according to the following test conditions:

Direction of Pull: 90° to seal

Crosshead Speed: 500 mm/minute

Full Scale Load: 5 kg

Number of Samples/Threshold: 1 percent of FSL

Break Criterion: 80 percent

Gauge Length: 2.0 inches (50.8 millimeters)

Sample Width: 1.0 inch (25.4 millimeters)

Physical properties of three-layer (A/B/A) films made from the resin blends shown in Table III are reported in Table IV below, and the results of hottack and heat seal strength are reported in Table V and VI, respectively.

TABLE IV

Physical Properties of Three-layer (A/B/A) Co-extruded Films

| Description | | | AFF 1880 + 20% 1351 (80% LDPE in core) | AFF 1880 + 20% 1351 3 MIL | AFF 1880 + 20% 1351 | AFF 1880 + 20% XU 60021.62 | AFF 1880 + 20% 5031 | AFF 1880 + 20% 5261 | AFFIN- ITY 1880 | EX 3033 + 20% XU 60021.62 | EX 3033 + 20% 1351 | EX 3033 + 20% 5031 | EX 3033 + 20% 5261 | EX 3033 |
|---|---|---|---|---|---|---|---|---|---|---|---|---|---|---|
| Gauge | mil | | 2.49 | 3.18 | 2.46 | 2.50 | 2.50 | 2.10 | 2.54 | 2.45 | 2.55 | 2.30 | 2.57 | 2.58 |
| Elmendorf | g | MD | 253 | 974 | 654 | 648 | 938 | 663 | 1,301 | 654 | 821 | 587 | 901 | 942 |
| Tear | | CD | 657 | 2,067 | 1,747 | 1,587 | 1,606 | 1,318 | 1,593 | 1,600 | 1,888 | 1,670 | 1,913 | 1,484 |
| Dart Impact | g | | 386 | 585 | 470 | 470 | 433 | 410 | >632 | 503 | 467 | 410 | 574 | 612 |
| Puncture Resistance | lbf | | 25.7 | 49.8 | 49.8 | 44.4 | 39.6 | 42.3 | 53.9 | 48.4 | 42.6 | 35.6 | 45.6 | 63.3 |
| Energy to Break Tensile | ft-lb/in3 | | 64.9 | 107.0 | 132.2 | 114.5 | 113.4 | 140.6 | 136.6 | 137.5 | 113.4 | 108.6 | 122.0 | 166.0 |
| Failure Load | lbf | MD | 10.2 | 15.4 | 12.7 | 10.7 | 12.7 | 10.3 | 12.9 | 13.8 | 13.9 | 12.7 | 13.8 | 14.5 |
| | | CD | 11.0 | 13.8 | 12.0 | 12.3 | 11.6 | 7.7 | 13.6 | 12.1 | 13.2 | 11.1 | 12.1 | 13.7 |
| Tensile Ulti- | psi | MD | 3,919 | 4,990 | 5,073 | 4,247 | 5,052 | 5,103 | 5,250 | 5,629 | 5,310 | 5,383 | 5,374 | 5,585 |
| mate | | CD | 4,296 | 4,524 | 4,990 | 4,913 | 4,719 | 4,799 | 5,479 | 5,040 | 5,271 | 5,136 | 4,539 | 5,424 |
| Elongation | % | MD | 499 | 703 | 652 | 780 | 677 | 709 | 662 | 745 | 731 | 736 | 741 | 726 |
| | | CD | 732 | 732 | 738 | 737 | 739 | 783 | 721 | 763 | 775 | 765 | 741 | 721 |
| Toughness | ft.lb in3 | MD | 1,101 | 1,425 | 1,357 | 1,195 | 1,369 | 1,458 | 1,244 | 1,665 | 1,574 | 1,512 | 1,552 | 1,364 |
| | | CD | 1,218 | 1,251 | 1,323 | 1,324 | 1,291 | 1,373 | 1,344 | 1,372 | 1,435 | 1,388 | 1,232 | 1,314 |

TABLE IV-continued

Physical Properties of Three-layer (A/B/A) Co-extruded Films

| Description | | | AFF 1880 + 20% 1351 (80% LDPE in core) | AFF 1880 + 20% 1351 3 MIL | AFF 1880 + 20% 1351 | AFF 1880 + 20% XU 60021.62 | AFF 1880 + 20% 5031 | AFF 1880 + 20% 5261 | AFFINITY 1880 | EX 3033 + 20% XU 60021.62 | EX 3033 + 20% 1351 | EX 3033 + 20% 5031 | EX 3033 + 20% 5261 | EX 3033 |
|---|---|---|---|---|---|---|---|---|---|---|---|---|---|---|
| Tensile Yield | psi | MD | 877 | 1,339 | 1,432 | 1,092 | 1,363 | 1,403 | 1,315 | 1,397 | 1,338 | 1,313 | 1,311 | 1,247 |
| | | CD | 1,384 | 1,378 | 1,423 | 1,429 | 1,393 | 1,396 | 1,439 | 1,490 | 1,423 | 1,454 | 1,375 | 1,378 |
| 1% Secant | psi | MD | 25,500 | 26,000 | 26,751 | 26,812 | 27,345 | 25,175 | 20,930 | 25,791 | 25,232 | 25,271 | 25,048 | 24,072 |
| | | CD | 30,400 | 30,300 | 31,562 | 32,861 | 32,467 | 27,572 | 29,143 | 33,209 | 29,713 | 30,601 | 27,849 | 28,956 |
| 2% Secant | psi | MD | 22,100 | 22,100 | 22,528 | 22,866 | 22,683 | 21,428 | 17,883 | 21,873 | 21,807 | 21,443 | 21,447 | 20,651 |
| | | CD | 25,200 | 25,500 | 25,452 | 27,490 | 26,052 | 22,596 | 24,442 | 27,194 | 24,388 | 24,946 | 22,941 | 23,711 |

TABLE V

Hottack Strength (N/in) pf Three-layer (A/B/A) Films

| °C. | AFF 1880 + 20% 1351 (80% LD in core) | AFF 1880 + 20% 1351 | AFF 1880 + 20% XU 60021.62 | AFF 1880 + 20% 5031 | AFF 1880 + 20% 5261 | AFFINITY 1880 | EX 3033 + 20% XU 60021.62 | EX 3033 + 20% 1351 | EX 3033 + 20% 5261 | EX 3033 |
|---|---|---|---|---|---|---|---|---|---|---|
| 75 | 0.20 | 0.32 | 0.20 | 0.15 | 0.21 | 0.27 | 0.20 | 0.16 | 0.21 | 0.19 |
| 80 | 0.32 | 0.92 | 0.76 | 0.44 | 0.89 | 0.61 | 0.17 | 0.18 | 0.23 | 0.18 |
| 85 | 1.42 | 2.39 | 2.29 | 2.02 | 1.63 | 2.78 | 0.35 | 0.23 | 1.07 | 1.15 |
| 90 | 2.41 | 3.00 | 2.91 | 2.66 | 2.84 | 3.35 | 1.49 | 1.31 | 1.70 | 3.23 |
| 95 | 3.62 | 4.10 | 3.74 | 3.40 | 3.39 | 3.74 | 3.96 | 3.83 | 3.31 | 5.51 |
| 100 | 4.74 | 4.70 | 4.56 | 4.32 | 3.60 | 4.74 | 6.49 | 6.36 | 5.02 | 5.99 |
| 105 | 5.23 | 5.33 | 5.40 | 4.15 | 4.20 | 4.54 | 7.87 | 6.86 | 5.18 | 7.08 |
| 110 | 4.11 | 4.40 | 4.33 | 4.02 | 4.24 | 4.38 | 7.83 | 6.83 | 5.21 | 6.71 |
| 115 | 3.52 | 3.70 | 3.93 | 3.62 | 3.78 | 3.95 | 7.32 | 6.25 | 4.58 | 6.18 |
| 120 | 2.91 | 3.10 | 3.42 | 2.93 | 3.40 | 3.46 | 6.16 | 5.87 | 3.62 | 5.50 |
| 125 | 2.73 | 2.80 | 2.98 | 2.91 | 2.89 | 2.82 | 5.21 | 4.97 | 3.35 | 5.09 |
| 130 | 2.56 | 2.36 | 2.81 | 2.70 | 2.68 | 2.58 | 4.54 | 4.30 | 3.26 | 4.68 |
| 135 | 2.39 | 2.39 | 2.73 | 2.62 | 2.38 | 2.74 | 3.85 | 3.73 | 2.95 | 4.35 |
| 140 | 2.21 | 2.28 | 2.51 | 2.32 | 2.23 | 2.85 | 3.53 | 3.40 | 2.51 | 4.24 |
| 145 | 1.90 | 2.06 | 2.26 | 2.24 | 2.08 | 2.71 | 2.70 | 3.03 | 2.42 | 3.96 |
| 150 | 1.83 | 1.72 | 2.19 | 2.20 | 1.97 | 2.42 | 2.65 | 2.65 | 2.30 | 3.68 |

TABLE VI

Heat Seal Strength (lb/in) of Three-layer (A/B/A) Films

| °C. | AFF 1880 + 20% 1351 (80% LD in core) | AFF 1880 + 20% 1351 | AFF 1880 + 20% XU 60021.62 | AFF 1880 + 20% 5031 | AFF 1880 + 20% 5261 | AFFINITY 1880 | ATTANE 4203 | EX 3033 + 20% XU 60021.62 | EX 3033 + 20% 1351 | EX 3033 + 20% 5261 | EX 3033 |
|---|---|---|---|---|---|---|---|---|---|---|---|
| 80 | 0.31 | 0.19 | 0.31 | 0.20 | 0.22 | 0.29 | 0.38 | | | | |
| 85 | 2.60 | 2.68 | 1.72 | 0.97 | 0.86 | 2.76 | 0.39 | 0.36 | 0.08 | 0.05 | 0.20 |
| 90 | 3.52 | 3.79 | 3.45 | 3.79 | 2.93 | 3.59 | 1.40 | 1.40 | 1.74 | 1.78 | 3.02 |
| 95 | 4.36 | 4.43 | 4.01 | 4.32 | 3.50 | 3.87 | 3.38 | 3.88 | 4.27 | 3.68 | 3.92 |
| 100 | 6.43 | 5.31 | 4.84 | 4.60 | 4.04 | 4.39 | 3.75 | 4.98 | 5.20 | 4.43 | 4.62 |
| 105 | 7.15 | 5.51 | 5.63 | 4.62 | 4.60 | 4.57 | 3.85 | 5.83 | 5.55 | 5.23 | 4.92 |
| 110 | 7.69 | 5.69 | 5.62 | 4.71 | 4.66 | 4.68 | 4.19 | 5.82 | 6.05 | 5.32 | 4.95 |
| 115 | 7.30 | 5.67 | 5.56 | 4.90 | 4.58 | 4.72 | 4.51 | 5.80 | 6.16 | 5.33 | 5.04 |
| 120 | | 5.56 | 5.74 | 5.16 | 4.92 | 4.88 | 5.33 | 5.95 | 6.16 | 5.59 | 4.96 |
| 125 | 7.60 | 5.31 | 5.97 | 5.23 | 5.10 | 4.99 | 5.27 | 6.01 | 6.28 | 5.33 | 4.98 |
| 130 | 8.23 | 5.89 | 5.92 | 5.04 | 5.05 | 5.05 | 5.24 | 6.38 | 6.37 | 4.99 | 4.95 |
| 135 | 8.34 | 5.48 | 5.93 | 5.19 | 5.24 | 5.20 | 5.35 | 6.15 | 6.28 | 5.58 | 5.00 |
| 140 | 8.77 | 5.46 | 5.91 | 4.94 | 5.36 | 5.57 | 5.42 | 5.95 | 6.39 | 5.43 | 5.30 |
| 145 | 8.52 | 5.43 | 5.87 | 4.95 | 5.50 | 5.60 | 5.67 | 6.04 | 6.51 | 5.56 | 4.98 |
| 150 | 8.86 | 5.52 | 5.70 | 4.93 | 5.20 | 5.40 | 5.73 | 6.53 | 6.58 | 5.70 | 5.13 |

The present invention is illustrated by the following examples but is not to be limited thereby.

EXAMPLES 9–13 AND CONPARATIVE EXAMPLE C

The 3-layer coextruded films made from resin blends described in Table III were slit to a width of 15 inches (38.1 cm) to produce 2-liter milk pouches using a Prepac IS6 Vertical, Form, Fill and Seal machine located at a commercial dairy. The unit packaged 2-liter milk filled pouches at the rate of 30 pouches per minute per filling head under normal operating conditions. For each film tested, approximately 16–20 milk-filled pouches were collected. They were inspected for initial seal integrity. Ten (10) pouches were drained, washed and dried for further evaluation.

The initial examination of end seal integrity involved three steps:

i) Determination Of On-Line Leakers
ii) Subjective Seal Strength Test
iii) Visual Examination of End Seals On Line Leakers On line leakers were only seen with the pouches made from 100% AFFINITY PL1880. No leakers were seen with the other films.

Subjective Seal Strength Test

The subjective seal strength test involved squeezing the pouch from one end until the pouch either yielded or the seal failed. Table VII shows that no seal failures were seen with the pouches made with films containing 20% by weight of 135I or XU 60021.62.

Visual Examination of End Seals

The pouches made from multilayer film containing only AFFINITY PL1880 in the seal layer had significant seal thinning and end seal stringers as shown in Table VIII. The pouches made with 20% LDPE 526I had some seal thinning and some end seal stringers film polymer filaments coming from the seal area. No seal thinning or stringers were found with the 20% pouches containing 20% LDPE 135I or LDPE XU 60021.62 in the seal layer of the film.

End Seal Strength 2-liter milk pouches were tested for end seal strength using an Instron Tensile Tester Model # 1122, under same conditions described in connection with the determination of heat seal strength hereinabove.

The seal strengths are shown in Table IX. Seal strength was found to increase as the melt strength of the polymer blend in the seal layer increased. No correlation was evident between LDPE melt index and seal strength.

Microscopy Examination of End Seals

The stringer regions and edge regions of the pouches were cryo-sectioned and examined using light microscopy techniques. Table X summarizes the results.

The pouches made from films containing 20% 135I and XU 60021.62 in the seal layer showed very little seal thinning and no end seal stringers (fine polymer filaments coming from the seal area), while the pouches containing 100% AFFINITY PL1880 had significant seal thinning and stringers.

Seal Region Film Thinning

The weakest part of a good seal is typically the film just in front of the seal bead. Any thinning of this film results in lower seal strengths since this is the region that fails when the seal is stressed. Comparing the melt strength of the resin blends (Table II) with the amount of film thinning seen with the pouches made with a commercial VFFS unit (Table X), it is seen that, as the melt strength of the resin blend increased, the amount of film thinning decreased. No correlation was seen between film thinning (Table X) and melt index of LDPE in resin blends (Table I).

TABLE VII

Commercial Dairy Prepac VFFS Evaluation
Subjective Seal Strengths

| Run # | LLDPE | LDPE | % LDPE | # Pouches Tested | # Seal Failure |
|---|---|---|---|---|---|
| Comparative C | AFFINITY PL1880 | | 0 | 7 | 2 |
| 9 | AFFINITY PL1880 | 526I | 20 | 7 | 1 |
| 10 | AFFINITY PL1880 | 135I | 20 | 7 | 0 |
| 11 | AFFINITY PL1880 | XU.62 | 20 | 7 | 0 |
| 12 | AFFINITY PL1880 3 mil | 135I | 20 | 8 | 0 |
| 13 | AFFINITY PL1880 80% LDPE in core | 135I | 20 | 7 | 0 |

TABLE VIII

Commercial Dairy Prepac VFFS Evaluation
Visual Examination of End Seals

| Run # | LLDPE | LDPE | % LDPE | Visual Examination of Seal |
|---|---|---|---|---|
| Comparative C | AFFINITY PL1880 | — | 0 | heavy stringers, seal thinning |
| 9 | AFFINITY PL1880 | 526I | 20 | some stringers, seal thinning |
| 10 | AFFINITY PL1880 | 135I | 20 | no stringers |
| 11 | AFFINITY PL1880 | XU.62 | 20 | no stringers |
| 12 | AFFINITY PL1880 3-mil | 135I | 20 | no stringers |
| 13 | AFFINITY PL1880 80% LDPE in core | 135I | 20 | no stringers |

TABLE IX

Prepac VFFS
Pouch End Seal Strength

| Run # | LLDPE MI | LDPE MI | % LDPE | Seal Strength, lb/in |
|---|---|---|---|---|
| Comparative C | AFFINITY PL1880 | — | 0 | 5.76 |
| 9 | AFFINITY PL1880 | 526I | 20 | 6.25 |
| 10 | AFFINITY PL1880 | 135I | 20 | 6.78 |
| 11 | AFFINITY PL1880 | XU.62 | 20 | 6.80 |
| 12 | AFFINITY PL1880 3 MIL | 135I | 20 | 7.73 |
| 13 | AFFINITY PL1880 80% LDPE IN CORE | 135I | 20 | 8.66 |

TABLE X

Prepac
VFFS Microscopy Analysis Summary

| # | Description | Comments | *Film Thickness µm | **Film Thickness Before Seal, µm | Reduction in Film Thickness, % |
|---|---|---|---|---|---|
| Comparative C | AFFINITY PL1880 | severe thinning and drawing of seal area many seal stringers | 69.1 | 45.9 | 33 |

TABLE X-continued

Prepac
VFFS Microscopy Analysis Summary

| # | Description | Comments | *Film Thickness μm | **Film Thickness Before Seal, μm | Reduction in Film Thickness, % |
|---|---|---|---|---|---|
| 9 | AFFINITY PL1880 + 20% LDPE 526I | severe thinning, many stingers | 71.8 | 51.9 | 28 |
| 10 | AFFINITY PL1880 + 20% LDPE 135I | good, no thinning, no stringers | 68.7 | 64.8 | 6 |
| 11 | AFFINITY PL1880 + 20% XU 60021.62 | good, no thinning, no stringers | 80.1 | 75.0 | 6 |
| 12 | AFFINITY PL1880 + 20% 135I ~ 3 MIL | good, no thinning, no stringers | 70.5 | 69.1 | 2 |
| 13 | AFFINITY PL1880 + 20% 135I - 80% LDPE in core | good, no thinning, no stringers | 67.2 | 65.6 | 2 |

*measured 550 μm from seal
**measured cross section at thinnest part of film before the seal Table XI shows Hottack data for LDPE 135I, AFFINITY PL1880, and EXACT 3033 as well as predicted and observed hottack values for the blends of 80% by weight of AFFINITY PL1880 or EXACT 3033 and 20% by weight of LDPE 135I. It can be seen that the observed hottack strength of the AFFINITY PL1880 or EXACT 3033 and LDPE 135I blends of the present invention is significantly higher than the predicted level for the blend indicating a clearly synergistic effect.

TABLE XI

Hottack Strength - Affinity Predicted vs. Observed Values

| °C. | N/IN AFFINITY PL1880 | EXACT 3033 | LDPE 135I | 80% AFFINITY PL1880 + 20% 135I - PREDICTED | AFFINITY PL1880 + 135I OBSERVED | 80% EXACT 3033 + 20% 135I PREDICTED | EXACT 3033 + 20% 135I - OBSERVED |
|---|---|---|---|---|---|---|---|
| 95 | 3.74 | 5.51 | 0.18 | 3.05 | 4.10 | 4.48 | 3.83 |
| 100 | 4.76 | 5.99 | 0.22 | 3.89 | 4.70 | 4.88 | 6.36 |
| 105 | 4.54 | 7.08 | 0.56 | 3.78 | 5.33 | 5.84 | 6.86 |
| 110 | 4.38 | 6.71 | 0.81 | 3.70 | 4.40 | 5.59 | 6.83 |
| 115 | 3.95 | 6.18 | 0.86 | 3.36 | 3.70 | 5.16 | 6.25 |
| 120 | 3.46 | 5.50 | 0.74 | 2.94 | 3.10 | 4.59 | 5.87 |
| 125 | 2.82 | 5.09 | 0.69 | 2.41 | 2.80 | 4.21 | 4.97 |
| 130 | 2.58 | 4.68 | 0.69 | 2.22 | 2.36 | 3.88 | 4.30 |
| 135 | 2.74 | 4.34 | 0.64 | 2.34 | 2.39 | 3.60 | 3.73 |

Predicted hottack strength was calculated as per the following:

(0.8× AFFINITY PL1880 hottack)+(0.2× LDPE hottack); or (0.8× EXACT 3033 hottack)+(0.2× LDPE hottack)

What is claimed is:

1. A film structure of a polymeric composition for a packaging application comprising:

(A) from 10 to 100 percent, based on the total weight of said composition, of a mixture of (1) from 5 to 95 percent by weight, based on 100 weight parts of said mixture, of at least one homogeneously branched substantially linear ethylene/ -olefin interpolymer characterized as having:

(a) a melt flow ratio, $I_{10}/I_2 \geq 5.63$;

(b) a molecular weight distribution, Mw/Mn, defined by the equation: $Mw/Mn \leq (I_{10}/I_2) - 4.63$, and (2) from 5 to 95 percent by weight, based on 100 weight parts of said mixture, of high pressure low density polyethylene having a density from 0.916 to 0.930 g/cm$^3$, a melt index of less than 1 g/10 minutes and melt strength greater than 10 cN as determined using a Gottfert Rheotens unit at 190° C.; and (B) from 0 to 90 percent, based on the total weight of said composition, at least one polymer selected from the group consisting of an ultra low density polyethylene, a linear low density polyethylene, a high pressure low density polyethylene, an ethylene-vinyl acetate copolymer, and a homogeneously branched linear ethylene polymer.

2. The film of claim 1 wherein the density of the linear ethylene copolymer is from 0.916 to 0.940 g/cm$^3$.

3. The film of claim 1 wherein the concentration of ethylene vinyl acetate copolymer is 5 to 85 percent based on the total weight of said composition.

4. The film of claim 1 wherein the concentration of ethylene vinyl acetate copolymer is 5 to 25 percent based on the total weight of said composition.

5. The film of claim 1 wherein the melt strength of the polymeric composition is in the range from 5 to 70 cN.

6. A film structure of a polymeric composition for a packaging application comprising:

(A) from 10 to 100 percent, based on the total weight of said composition, of a mixture of (1) from 5 to 95 percent by weight, based on 100 weight parts of said mixture, homogeneously branched linear ethylene polymer, and (2) from 5 to 95 percent by weight, based on 100 weight parts of said mixture, of high pressure low density polyethylene having a density from 0.916 to 0.930 g/cm$^3$, a melt index of less than 1 g/10 minutes and melt strength greater than 10 cN as determined using a Gottfert Rheotens unit at 190° C.; and (B) from 0 to 90 percent, based on the total weight of said composition, at least one polymer selected from the group consisting of an ultra low density polyethylene, a linear low density polyethylene, a high pressure low density polyethylene, an ethylene-vinyl acetate copolymer, and homogeneously branched substantially linear ethylene/α-olefin interpolymer.

7. The film of claim 6 wherein the density of the linear ethylene copolymer is from 0.916 to 0.940 g/cm³.

8. The film of claim 6 wherein the concentration of ethylene vinyl acetate copolymer is 5 to 85 percent based on the total weight of said composition.

9. The film of claim 6 wherein the concentration of ethylene vinyl acetate copolymer is 5 to 25 percent based on the total weight of said composition.

10. The film of claim 6 wherein the melt strength of the polymeric composition is in the range from 5 to 70 cN.

* * * * *